(12) United States Patent
Gersemsky et al.

(10) Patent No.: US 7,711,056 B2
(45) Date of Patent: May 4, 2010

(54) TRANSMITTING AND RECEIVING ARRANGEMENT WITH A CHANNEL-ORIENTED LINK

(75) Inventors: Frank Gersemsky, Recklinghausen (DE); Christian Kranz, Ratingen Lintorf (DE); Rüdiger Lorenz, Dinslaken (DE); Bernd Schmandt, Wuppertal (DE); Elmar Wagner, Duisburg (DE)

(73) Assignee: Infineon Technologies AG, Munich (DE)

( * ) Notice: Subject to any disclaimer, the term of this patent is extended or adjusted under 35 U.S.C. 154(b) by 1243 days.

(21) Appl. No.: 10/514,332

(22) PCT Filed: May 5, 2003

(86) PCT No.: PCT/DE03/01427

§ 371 (c)(1),
(2), (4) Date: Sep. 28, 2005

(87) PCT Pub. No.: WO03/096563

PCT Pub. Date: Nov. 20, 2003

(65) Prior Publication Data

US 2006/0239362 A1  Oct. 26, 2006

(30) Foreign Application Priority Data

May 14, 2002  (DE)  ................ 102 21 424

(51) Int. Cl.
*H04L 27/00* (2006.01)

(52) U.S. Cl. .............. 375/259; 375/219; 375/220; 455/422.1; 455/561

(58) Field of Classification Search ............ 375/219, 375/259

See application file for complete search history.

(56) References Cited

U.S. PATENT DOCUMENTS 3,696,338 A * 10/1972 Preiss ................... 710/60
5,590,404 A * 12/1996 Sato et al.

(Continued)

FOREIGN PATENT DOCUMENTS

DE  44 07 125 A1 * 9/1995

(Continued)

OTHER PUBLICATIONS

Christian Durdodt et al. "A Low-IF RX Two-Point Sigma Delta-Modulation TX CMOS Single-Chip Bluetooth Solution", IEEE 2001.*

(Continued)

*Primary Examiner*—David C Payne
*Assistant Examiner*—Leon Flores
(74) *Attorney, Agent, or Firm*—Eschweiler & Associates, LLC

(57) ABSTRACT

A transmitting and receiving arrangement as well as a method for transmission of monitoring and/or payload data in a transmitting and receiving arrangement for a wirefree communications system has a device which processes baseband for processing digital signals to form a baseband signal and a device which processes radio frequency for conversion of the baseband signal to a radio frequency signal. Monitoring and/or payload data are/is transmitted in the form of data packets via at least one channel of a channel-oriented link between the device which processes baseband and the device which processes radio frequency.

4 Claims, 1 Drawing Sheet

U.S. PATENT DOCUMENTS

| | | | | |
|---|---|---|---|---|
| 5,898,905 | A | * | 4/1999 | Aldridge et al. .......... 455/67.14 |
| 5,953,375 | A | * | 9/1999 | Nishiwaki et al. ........... 375/259 |
| 6,072,994 | A | * | 6/2000 | Phillips et al. ................ 455/84 |
| 6,408,340 | B1 | * | 6/2002 | Janssen et al. .............. 709/248 |
| 7,149,473 | B1 | * | 12/2006 | Lindlar et al. ............. 455/41.1 |
| 7,233,620 | B2 | * | 6/2007 | Brommer .................... 375/240 |
| 2002/0142741 | A1 | * | 10/2002 | Molnar et al. ............... 455/127 |
| 2002/0193140 | A1 | * | 12/2002 | Behrens et al. ............. 455/553 |
| 2003/0021262 | A1 | * | 1/2003 | Ma et al. .................... 370/352 |
| 2003/0147459 | A1 | * | 8/2003 | Ryter ......................... 375/219 |
| 2004/0204096 | A1 | * | 10/2004 | Hirsch et al. ................ 455/561 |

FOREIGN PATENT DOCUMENTS

| | | | |
|---|---|---|---|
| DE | 199 18 059 C1 | * | 11/2000 |
| DE | 100 26 152 A1 | * | 2/2001 |
| EP | 0 295 373 A2 | | 12/1988 |
| EP | 0 975 196 A2 | | 1/2000 |
| GB | 2346301 A | | 8/2000 |
| JP | 2001-345732 | | 12/2001 |
| WO | WO 02/11307 A1 | * | 2/2002 |
| WO | WO 03/077481 A1 | | 9/2003 |

OTHER PUBLICATIONS

Elmer Wagner et al."A Low-IF RX Two-Point ΣΔ-Modulation TX CMOS Single-Chip Bluetooth Solution" IEEE 2001.*

"ARINC 429 Digital Data Communications for Commercial Aircraft", Randall K. Chun, Journal of Guidance and Control and Dynamics, AIAA, New York, US, vol. 6, No. 2, Mar. 1983, pp. 120-123.*

International Search Report, Int'l. App. No. PCT/DE03/01427, Int'l Filing Date May 5, 2003, 3 pgs.*

* cited by examiner

TRANSMITTING AND RECEIVING ARRANGEMENT WITH A CHANNEL-ORIENTED LINK

RELATED APPLICATION

This application is a national stage application of International Application No. PCT/DE03/01427 filed May 5, 2003, which is entitled "TRANSMITTING AND RECEIVING ARRANGEMENT WITH A CHANNEL-ORIENTED LINK", which was not published in English, and claims priority to German Patent Application Serial No. 102 21 424.7, which was filed on May 14, 2002, which is hereby incorporated by reference in its entirety.

FIELD OF THE INVENTION

The present invention relates to a transmitting and receiving arrangement, and to a method for transmission of monitoring and payload data in such an arrangement.

BACKGROUND OF THE INVENTION.

In wirefree communications systems, a distinction is normally drawn between fixed stations and mobile stations, in which case two or more mobile stations can communicate with one fixed station. In recent years, a range of standardized modulation methods, such as DECT, WDCT, Bluetooth, GSM or 3GPP have become established in the field of mobile radio technology. Transmission data, such as speech, text or image data, is modulated by means of modulators onto a carrier frequency in the transmitting devices in the fixed stations and in the mobile stations. These modulators are generally formed from different functional units. Normally, they are split into a baseband part and a radio frequency part.

Within the baseband part, a baseband signal is produced from the data to be transmitted, by means of digital signal processing. This relatively low-frequency baseband signal is shifted to radio frequency within the radio frequency part. This shifting process is carried out, by way of example, using a homodyne or heterodyne transmission architecture. The data to be transmitted is then sent, after power amplification, by means of an antenna via a radio channel. The data is received in a corresponding manner, first of all via the radio frequency part, in which the original baseband signal is reproduced from the radio frequency signal, and then via the baseband part, in order to obtain the data to be transmitted.

Owing to the different physical requirement, the baseband and radio frequency parts are generally produced using integrated circuits (semiconductor chips) which are separate from one another. This subdivision is also necessary, in particular, as a result of the different power and frequency requirement. One already known example of such semiconductor chips is the DECT PMB 6720 baseband chip, and the DECT PMB 6610 radio frequency chip, from Infineon Technologies AG. The baseband chip and the radio frequency chip are connected to one another via a large number of lines in order to transmit the baseband signal and a range of control signals. A large number of connecting pins are therefore required on both semiconductor chips. In contrast, a small number of connecting pins allows a simplified circuit layout. The production of both the semiconductor chips and of a circuit board in which the two semiconductor chips are connected to one another can thus be simplified, with its cost being reduced. A small number of connecting pins furthermore leads to a reduced contact area, once again allowing a simple housing choice for the baseband and radio frequency part, and thus a lower-cost system solution for the transmitting and receiving arrangement.

SUMMARY OF THE INVENTION.

The present invention is directed to a system and method that allows a small number of connecting pins on the semiconductor chips.

The data which is transmitted from the baseband chip to the radio frequency chip can be subdivided into two classes. One element of the data to be transmitted is payload data, which contains the information to be transmitted in the wirefree communications system. A further element is monitoring or command data between the two semiconductor chips, for example in order to synchronize the clock signals on the two semiconductor chips and to regulate or to control the transmission power, the transmission frequency, the transmission amplitude, and the process of switching the transmitter and receiver on and off, etc.

The data is normally transmitted as a data stream. This means that the data must be transmitted using an accurately defined clock, which generally corresponds to the symbol rate of the radio channel in the wirefree communications system, or to an integer multiple of it.

If the transmitting and receiving arrangement has at least one channel of the channel-oriented link, via which monitoring and/or payload data can be transmitted, or if the at least one channel of the channel-oriented link is designed either for unidirectional or bidirectional data transmission of the monitoring and/or payload data, this allows the number of physical lines between the device which processes baseband and the device which processes radio frequency to be reduced to a minimum. In one extreme solution, only a single physical line is required between the two semiconductor chips, providing a bidirectional channel for transmission of payload and monitoring data.

If the transmitting and receiving arrangement has at least one buffer store between the channel-oriented link and the device which processes baseband or the device which processes radio frequency, for storage of sequentially transmitted data, a buffer store such as this allows data transmission between the two semiconductor chips at a fixed mean data rate, as may be necessary, for example, if there is a fixed symbol rate in the transmission direction. Short-term discrepancies can be coped with by the transmitted data being temporarily stored in the buffer store at the receiving end of the channel-oriented link.

If the channel-oriented link has a further channel via which a clock signal, which is produced in the device which processes radio frequency, can be transmitted to the device which processes baseband, this allows synchronization of the clock signals in the device which processes radio frequency and in the device which processes baseband.

In one embodiment, in which a clock for at least one channel of the channel-oriented link can be derived by means of the clock signal which is produced in the device which processes radio frequency, there is no need for a separate clock line for data transmission via a channel.

If a system clock for the device which processes baseband can be derived by means of a clock signal which is produced in the device which processes radio frequency, this means that there is no need for an oscillator in the device which processes baseband, thus allowing the area of silicon in the semiconductor chip to be reduced. It is likewise advantageous that this makes it possible to reduce the power consumption of the device which processes baseband.

The identification of the packet by means of packet indicator information, for example a single bit, allows both payload data and monitoring data to be transmitted via one channel of the channel-oriented link.

If the device which processes baseband receives a reduced clock signal, in which only every n-th clock pulse of the clock signal which is produced by the device which processes radio frequency is sent to the device which processes baseband, then the device which processes baseband is changed to a mode in which less power is required (low power mode). In a mode such as this, the transmitting end and receiving end of the device which processes radio frequency are normally unused. The transmission of the reduced clock signal provides a reference clock for the device which processes baseband.

BRIEF DESCRIPTION OF THE DRAWINGS

The invention will be explained in more detail in the following text using a number of exemplary embodiments and with reference to the drawings, in which.

DETAILED DESCRIPTION OF THE INVENTION

Figure 1:
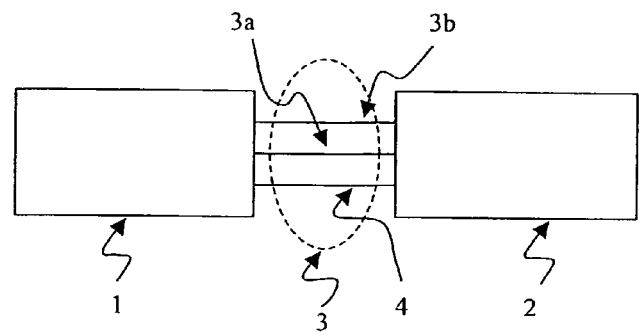
FIG. 1 shows a simplified block diagram with a transmitting and receiving arrangement connected via three channels.

FIG. 1 shows, schematically, a transmitting and receiving arrangement for a wirefree communications system with a device (1) which processes baseband and a device (2) which processes radio frequency. The two devices are connected to one another via a channel-oriented link (3). This channel-oriented link (3) is used for transmission of payload and monitoring data between the device (1) which processes baseband and the device (2) which processes radio frequency, and vice versa. The channel-oriented link (3) in this case comprises a number of channels (3a, 3b, 4), which are designed for transmission of monitoring and/or payload data. The data is preferably transmitted as data packets, in which case the transmission may be unidirectional or bidirectional. Bidirectional transmission of data can use, for example, a half-duplex method.

In one preferred embodiment, each channel corresponds to a physical line between the device (1) which processes baseband and the device (2) which processes radio frequency. In another embodiment, at least one channel comprises a number of physical lines, thus allowing sequential transmission of data symbols, which comprise a number of bits, or serial transmission of data.

The data is preferably transmitted using a clock which is independent of the symbol rate in the communications system. Both payload data and monitoring data are transmitted as data packets. In one preferred embodiment, the transmitting and receiving arrangement according to the invention has a channel (3a) via which monitoring and payload data is transmitted from the device (1) which processes baseband to the device (2) which processes radio frequency. Monitoring and payload data are transmitted from the device (2) which processes radio frequency to the device (1) which processes baseband via a further channel (3b). A third channel (4) is used to transmit a clock signal to the device (1) which processes baseband, and this clock signal is produced in the device (2) which processes radio frequency. This clock signal runs continuously.

A system clock is preferably generated from the clock signal in the device (1) which processes baseband. It is also possible to use clock signals which are transmitted from the device (2) which processes radio frequency to the device (1) which processes baseband as the transmission clock for the data packets.

Figure 2:
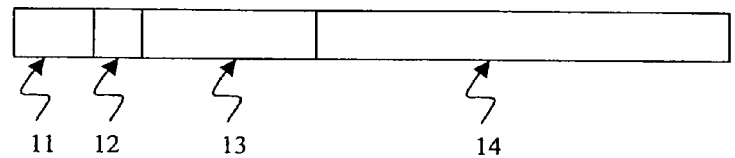
FIG. 2 shows an example of the layout of a data packet.

FIG. 2 illustrates, symbolically, an example of the layout of a data packet, in the form of which monitoring and payload data are transmitted. Each packet starts with a start bit (11). The receiver (the device (1) which processes baseband or the device (2) which processes radio frequency), can use the start bit to determine the start of a data packet. The start bit can likewise be used in order to determine an optimum sampling time (clock recovery). This determination is necessary as soon as adequate synchronicity is lost between the data signal and the transmission clock. It is likewise possible for a synchronization sequence (11) which comprises a fixed sequence of bits to be transmitted instead of the start bit (11).

The start bit (11) is immediately followed by a packet indicator (12), which indicates whether monitoring data or payload data is being transmitted from then on. The distinction is drawn on the basis of a bit, although it is also feasible to use a symbol comprising a number of bits for this purpose. This allows the data packet to be passed on efficiently in the device (1) which processes baseband and in the device (2) which processes radio frequency.

The following text draws a distinction between monitoring and payload data packets.

In a monitoring data packet, the packet indicator (12) is followed by a register address (13), to which the monitoring data is directed. Register-oriented data transmission is thus possible between the device (1) which processes baseband and the device (2) which processes radio frequency, and vice versa. The register address (13) is followed by a data segment (14) which may, for example, contain a command or status information.

In a payload data packet, the packet indicator (12) is followed by a length statement (13), which indicates the length of the following data segment (14). The data segment (14) contains the payload data to be transmitted. Variable length allows either a high net bit rate if the data segment is long, or a longer latency time if the data segment is short. The latter may be required, in particular, for the transmission of speech data.

The transmission of monitoring and payload data in the form of data packets allows a range of ways of transmission.

Many of the actions of the device (1) which processes baseband and of the device (2) which processes radio frequency are linked to specific times. One example is the start time of a transmit packet in the protocol for the wirefree communications system. This start time is defined by the device (1) which processes baseband, and is transmitted to the device (2) which processes radio frequency.

One alternative for transmission of the start time for a transmit packet is to transmit a monitoring or payload data packet at a precisely defined time. For this purpose, the monitoring or payload data packet is positioned accurately in the symbol time pattern of the wirefree communications system. In addition to its content, a monitoring or payload data packet such as this thus contains additional time information.

A further alternative is to set the packet length and the packet frequency of monitoring or payload data packets such that the mean data transmission rate via the channel-oriented link (3) corresponds substantially to the symbol rate of the wirefree communications system. Short-term discrepancies can be coped with in a buffer store, or a FiFo (first-in, first-out) memory at the receiving end of the channel-oriented link (3). For this purpose, it is possible to provide for the interval between the data packets to be set such that it is fixed, or for the data packets to be transmitted with a set periodicity.

Another alternative is for the device (2) which processes radio frequency to request each data packet individually. A request such as this is made when, for example, the buffer store at the receiving end of the device (2) which processes radio frequency can be replenished. A request such as this for a data packet is always made in such a way that the buffer store does not run empty. In order to allow this, the device (2) which processes radio frequency may allow an inlet flow of monitoring or payload data packets via the channel-oriented link (3) when the buffer store is below a specific filling level, and may prevent an inlet flow of monitoring or payload data packets when the buffer store exceeds a specific filling level. If no data is stored in the buffer store, then no data will have been transmitted for a lengthy time period from the device (1) which processes baseband to the device (2) which processes radio frequency. It is thus feasible to select the buffer store running empty as a starting time for an event, such as switching to a power saving mode.

Figure 3:
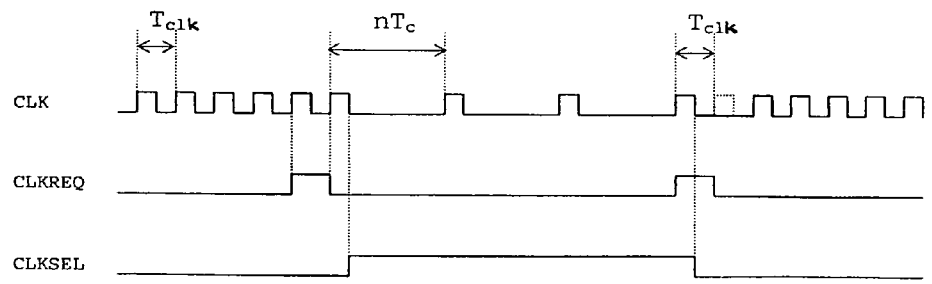
FIG. 3 shows an example of the signal waveform on the channel-oriented link for the transmission of a reduced clock signal.

FIG. 3 shows an example of the signal waveform on the channel-oriented link (3) during the transmission of a reduced clock signal. The illustration shows three channels (CLK, CLKREQ, CLKSEL) on the channel-oriented link (3). A clock signal in the form of a sequence of clock pulses whose rising flanks are separated by a time interval Tclk is transmitted via the channel (CLK). In order to initiate the transmission of a reduced clock signal, the device (1) which processes baseband sends a pulse on the channel (CLKREQ) whose rising flank coincides with the rising flank of one pulse of the clock signal on the channel (CLK). The device (2) which processes radio frequency subsequently transmits only every n-th pulse via the channel (CLK). The device (1) which processes baseband thus receives a reduced clock signal, in the form of pulses whose rising flanks are separated by the time interval $nT_{clk}$. This transmission of the reduced clock signal is possible, for example, by masking out those pulses are separated by the time interval nTclk. The device (2) which processes radio frequency at the same time responds to the pulse on the channel (CLKREQ) with a level change on the channel (CLKSEL). In this case, the rising flank of the level on the channel (CLKSEL) and the falling flank of the pulse of the clock signal on the channel (CLK) coincide. The new level signals to the device (1) which processes baseband that a reduced clock signal is being transmitted via the channel (CLK).

The device (1) which processes baseband transmits another pulse on the channel (CLKREQ) to end the transmission of the reduced clock signal. The masking out of the pulses of the clock signal is stopped with the falling flank of the pulse on the channel (CLKREQ). At the same time, the level on the channel (CLKSEL) is reset to the original value, in order to indicate to the device (1) which processes baseband that the original clock signal is being transmitted.

It is likewise feasible for the device (2) which processes radio frequency to itself end the transmission of the reduced clock signal.

The device (1) which processes baseband can preferably switch between a packet mode, in which monitoring or payload data packets are transmitted via the channel-oriented link (3), and a signal mode, in which it is not possible to transmit monitoring or payload data packets, but in which the reduced clock signal is transmitted. The transition from the packet mode to the signal mode can be made by the transmission of a specific monitoring data packet in the packet mode. Another possibility is to make a transition to the signal mode as soon as at least one buffer store at the receiving ends of the channel-oriented link (3) does not contain any data.

The transition from the signal mode to the packet mode is made as soon as the transmission of the reduced clock signal has been ended, and the original clock signal is being transmitted via the channel (CLK).

The invention claimed is:

1. A method for transmission of monitoring and payload data in a transmitting and receiving arrangement for a wire-free communications system, comprising:
   providing a device which processes baseband and is integrated on a first semiconductor chip for processing digital signals to form a baseband signal, and vice versa,
   providing a device which processes radio frequency and is integrated on a second semiconductor chip for conversion of the baseband signal to a radio-frequency signal, and vice versa,
   providing a link between the baseband device and the radio frequency device,
   transmitting monitoring data and payload data between the two semiconductor chips in the form of data packets via at least one channel of the link,
   wherein the at least one channel comprises one or more physical lines between the device which processes baseband and the device which processes radio frequency, for bit-by-bit or symbol-by-symbol data transmission, and
   wherein the data packets in each case comprise a first part and a second part, and wherein a start of the first part comprises a start bit, which indicates the start of a data packet to the baseband device or to the radio-frequency device, and the first part further comprises packet indicator information, consisting of a single bit, which indicates whether the data packet is being used to transmit monitoring or payload data,
   providing a periodic clock signal in the device which processes radio frequency from a sequence of clock pulses,
   transmitting the periodic clock signal via a further channel of the link to the device which processes baseband,
   wherein the periodic clock signal comprises a reduced clock signal that is transmitted to the device which processes baseband, in which only every n-th clock pulse of the sequence of clock pulses which is produced in the device which processes radio frequency is transmitted to the device which processes baseband, wherein n is an integer greater than zero, and
   providing the device which processes baseband with an indication as to whether the reduced clock signal is being transmitted to the device which processes baseband, via a status indicator provided from the device which transmits radio frequency to the device which transmits baseband via at least one channel of the link.

2. The method as claimed in claim 1, further comprising determining a clock for at least one channel of the link or a system clock in the device which processes baseband based on the periodic clock signal which is transmitted to the device which processes baseband.

3. A method for transmission of monitoring and payload data in a transmitting and receiving arrangement for a wire-free communications system, comprising:
   providing a device which processes baseband and is integrated on a first semiconductor chip for processing digital signals to form a baseband signal, and vice versa;
   providing a device which processes radio frequency and is integrated on a second semiconductor chip for conversion of the baseband signal to a radio-frequency signal, and vice versa;

providing a link between the baseband device and the radio frequency device;

transmitting monitoring data and payload data between the two semiconductor chips in the form of data packets via at least one channel of the link, wherein the at least one channel comprises one or more physical lines between the device which processes baseband and the device which processes radio frequency, for bit-by-bit or symbol-by-symbol data transmission;

providing a periodic clock signal in the device which processes radio frequency from a sequence of clock pulses; and transmitting the periodic clock signal via a further channel of the link to the device which processes baseband, wherein the periodic clock signal comprises a reduced clock signal that is transmitted to the device which processes baseband, in which only every n-th clock pulse of the sequence of clock pulses which is produced in the device which processes radio frequency is transmitted to the device which processes baseband, wherein n is an integer greater than zero, and wherein, while the reduced clock signal is transmitted, no monitoring data packets and no payload data packets are transmitted between the two semiconductor chips.

4. A method for transmission of monitoring and payload data in a transmitting and receiving arrangement for a wire-free communications system, comprising:

providing a device which processes baseband and is integrated on a first semiconductor chin for processing digital signals to form a baseband signal, and vice versa, providing a device which processes radio frequency and is integrated on a second semiconductor chin for conversion of the baseband signal to a radio frequency signal, and vice versa, providing a link between the baseband device and the radio frequency device, transmitting monitoring data and payload data between the two semiconductor chips in the form of data packets via at least one channel of the link, wherein the at least one channel comprises one or more physical lines between the device which processes baseband and the device which processes radio frequency, for bit-by-bit or symbol-by-symbol data transmission, and wherein the data packets in each case comprise a first part and a second part, and wherein a start of the first part comprises a start bit, which indicates the start of a data packet to the baseband device or to the radio frequency device, and the first part further comprises packet indicator information, consisting of a single bit, which indicates whether the data packet is being used to transmit monitoring or payload data, providing a periodic clock signal in the device which processes radio frequency from a sequence of clock pulses, and transmitting the periodic clock signal via a further channel of the link to the device which processes baseband, wherein the periodic clock signal comprises a reduced clock signal that is transmitted to the device which processes baseband, in which only every n-th clock pulse of the sequence of clock pulses which is produced in the device which processes radio frequency is transmitted to the device which processes baseband, wherein n is an integer greater than zero, and wherein, while the reduced clock signal is transmitted, no monitoring data packets and no payload packets are transmitted between the two semiconductor chips.

* * * * *